US012782561B2

(12) United States Patent
Crouch

(10) Patent No.: US 12,782,561 B2
(45) Date of Patent: Nov. 3, 2026

(54) DIRECTING ENERGY BY DISTRIBUTED ARRAY OF INDEPENDENT COHERENT MOBILE ELEMENTS

(71) Applicant: RAYTHEON COMPANY, Waltham, MA (US)

(72) Inventor: David D. Crouch, Farragut, TN (US)

(73) Assignee: Raytheon Company, Arlington, VA (US)

( * ) Notice: Subject to any disclaimer, the term of this patent is extended or adjusted under 35 U.S.C. 154(b) by 961 days.

(21) Appl. No.: 18/093,276

(22) Filed: Jan. 4, 2023

(65) Prior Publication Data

US 2024/0219563 A1 Jul. 4, 2024

(51) Int. Cl.

| | |
|---|---|
| ***G01S 17/08*** | (2006.01) |
| ***G01S 5/16*** | (2006.01) |
| ***H04B 10/61*** | (2013.01) |

(52) U.S. Cl.

CPC ................ *G01S 17/08* (2013.01); *G01S 5/16* (2013.01); *H04B 10/61* (2013.01)

(58) Field of Classification Search

None

See application file for complete search history.

(56) References Cited

U.S. PATENT DOCUMENTS

| | | | |
|---|---|---|---|
| 8,767,192 B2 | 7/2014 | Crouch | |
| 2013/0002472 A1* | 1/2013 | Crouch | G01S 7/4863 342/370 |
| 2017/0156123 A1 | 6/2017 | Smith et al. | |
| 2020/0302641 A1* | 9/2020 | El-Sallabi | H04N 23/90 |
| 2024/0264307 A1* | 8/2024 | Nakada | G01S 17/32 |

OTHER PUBLICATIONS

J. A. Nanzer, S. R. Mghabghab, S. M. Ellison and A. Schlegel, "Distributed Phased Arrays: Challenges and Recent Advances," in IEEE Transactions on Microwave Theory and Techniques, vol. 69, No. 11, pp. 4893-4907, Nov. 2021.

* cited by examiner

*Primary Examiner* — Whitney Moore

(57) ABSTRACT

Method and system for directing RF energy from an active retrodirective antenna array including moving elements onto a target includes: receiving a beacon from the target by each element, the scattered beacon including an RF pilot signal imposed thereon, extracting the RF pilot signal from the received scattered optical beacon, dynamically measuring a distance to an area of optical beacon illumination on the target, calculating a phase utilizing the measured distance to the area of the target and a frequency of the extracted RF pilot signal, phase conjugating the RF pilot signal based on the calculated phase, and transmitting the phase conjugated RF signal towards the target; by each element, where the phase conjugated RF signal transmitted by each element add coherently at the area of optical beacon illumination on the target to enhance power density on the target.

20 Claims, 4 Drawing Sheets

DIRECTING ENERGY BY DISTRIBUTED ARRAY OF INDEPENDENT COHERENT MOBILE ELEMENTS

FIELD

The present disclosure generally relates to active antenna arrays and more particularly to 3-D arrays of independent coherent mobile elements to direct and focus energy on a target.

BACKGROUND

An active retrodirective antenna array (ARAA) is a phased antenna array that automatically steers its transmitted beam towards the apparent source of an incoming pilot signal. The radiated power is typically generated by sources associated with the antenna, rather than by reflection of an incident signal as in a passive retrodirective antenna.

When a retrodirective array receives an RF pilot signal from an unspecified direction, the array generates and transmits a phase-conjugated RF pilot signal in the reverse direction without any previous knowledge as to the location of the signal source and without the need for sophisticated digital signal processing. The array elements may be randomly fixedly dispersed over a wide area, and knowledge of their positions is not required. The source of the RF pilot signal is a microwave beacon attached to a cooperative target.

However, many applications require illuminating a non-cooperative target with moderate-to-high RF power density. Examples include directed energy, radar, and electronic warfare. This is currently carried out by large systems operating from standoff distances. System cost, size, weight, and power are driven primarily by the radiated and prime power required to overcome $1/R^2$ losses.

Additionally, conventional retrodirective arrays require a common phase reference and three dimensional element coordinates (X,Y,Z) are not needed. Phase information is transmitted to each element over a wired network such as a set of phase-matched cables. For example, a centrally-located reference oscillator can distribute a reference signal to all elements via a set of phase-matched cables (the signal phase accumulated in propagating from one end of the cable to the other is ideally the same for all cables). This way, the reference signal arriving at each element is of the same frequency and phase. The positions and movement of array elements is clearly restricted by the need for a wired phase distribution network.

Accordingly, there is a need for a lower-cost, mobile and rapidly-deployable alternative for illuminating a target with moderate-to-high RF power density that operates from short range.

SUMMARY

In some embodiments, the disclosure is directed to a method of directing RF energy from an active retrodirective antenna array comprising a plurality of moving elements onto a target. The method includes: receiving a virtual beacon scattered from the target by each element, the scattered virtual beacon including an RF pilot signal imposed thereon; extracting the RF pilot signal from the received scattered virtual beacon, by each element; dynamically measuring a distance to an area of virtual beacon illumination on the target, by each element; calculating a phase utilizing the measured distance to the area of the target and a frequency of the extracted RF pilot signal, by each element; phase conjugating the RF pilot signal based on the calculated phase, by each element; and transmitting the phase conjugated RF signal towards the target, by each element. The phase conjugated RF signals transmitted by the plurality of moving elements adds coherently at the area of virtual beacon illumination on the target to enhance power density on the target.

In some embodiments, the disclosure is directed to a method of directing RF energy from an active retrodirective antenna array comprising a plurality of moving elements onto a target. The method includes: receiving an RF beacon signal from the target by each element; generating an RF pilot signal from the received RF beacon, by each element; dynamically measuring a distance to a physical beacon on the target, by each element; calculating a phase utilizing the measured distance to physical beacon on the target and a frequency of the extracted RF pilot signal, by each element; phase conjugating the RF pilot signal based on the calculated phase, by each element; and transmitting the phase conjugated RF signal towards the target, by each element. The phase conjugated RF signals transmitted by the plurality of moving elements adds coherently at and around the physical beacon on the target to enhance power density on the target.

In some embodiments, the disclosure is directed to a system for directing RF energy from an active retrodirective antenna array comprising a plurality of moving elements onto a target. The system includes: means for receiving a virtual beacon scattered from the target by each element, the scattered virtual beacon including an RF pilot signal imposed thereon; means for extracting the RF pilot signal from the received scattered virtual beacon, by each element; means for dynamically measuring a distance to an area of virtual beacon illumination on the target, by each element; means for calculating a phase utilizing the measured distance to the area of the target and a frequency of the extracted RF pilot signal, by each element; means for phase conjugating the RF pilot signal based on the calculated phase, by each element; and means for transmitting the phase conjugated RF signal towards the target, by each element. The phase conjugated RF signals transmitted by the plurality of moving elements adds coherently at the area of virtual beacon illumination on the target to enhance power density on the target

BRIEF DESCRIPTION OF THE DRAWINGS

The components in the figures are not necessarily to scale, emphasis instead being placed upon illustrating the principles of the disclosure. Like reference numerals designate corresponding parts throughout the different views. Embodiments are illustrated by way of example and not limitation in the figures of the accompanying drawings, in which.

DETAIL DESCRIPTION

In some embodiments, the present disclosure is directed to an array of independent coherent mobile (antenna) elements, where the distance to the target from each mobile array element is measured and used to synchronize radiated signals transmitted by each array element on a small spot of virtual beacon illumination on the target, where they add coherently to enhance power density. That is, the width of the "small" spot is much less than the free-space wavelength of the RF pilot signal.

In some embodiments, the virtual beacon distributes modulation and timing information to the array elements. The carrier for the beacon signal may or may not be optical, however, its frequency is much higher than that of the impressed RF pilot signal. For example, if the RF pilot signal frequency is 1 GHz, the carrier frequency can be millimeter wave (e.g., 100 GHz), terahertz, infrared, visible, or ultraviolet. This way, element-by-element coherence is achieved using target-to-element distance information, where a self-generated reference synchronization signal is derived from a beacon signal. Each array element generates a frequency and phase-synchronized reference signal using target-to-element range data to correct the phase of each of the radiated signals transmitted by each of the individual array elements towards the target.

That is, the distance to the target from each moving array element is dynamically measured and is used to correct the phase of the virtual-beacon derived reference signal by cancelling target-to-element propagation phase. The phase of the corrected reference signal is ideally equal to that of the RF modulation at the target, resulting in a set of distributed reference signals having the same phase. Each synchronized reference signal is used to phase conjugate an RF pilot signal extracted from the received beacon signal. The phase conjugated signal is transmitted and arrives at the target at a small spot, referred to as a virtual beacon, with a phase that is ideally equal to that of the phase conjugated signals from all other elements. This dynamic measurement of the range of each moving array element to the target and dynamic adjustment of the phases of the corresponding signals back to the target enables the elements to be mobile and not stationary and yet results in a coherent "spot" on the target to enhance the power density. This is in contrast to the conventional approaches, for which the array elements must be stationary.

Since the (antenna) array elements are relatively smaller and cheaper, they can easily be deployed, replaced, or re-deployed, while maximizing the power density on the target. Furthermore, the retrodirective array of the present disclosure does not require knowledge of element positions (only their distance to the target).

Figure 1:
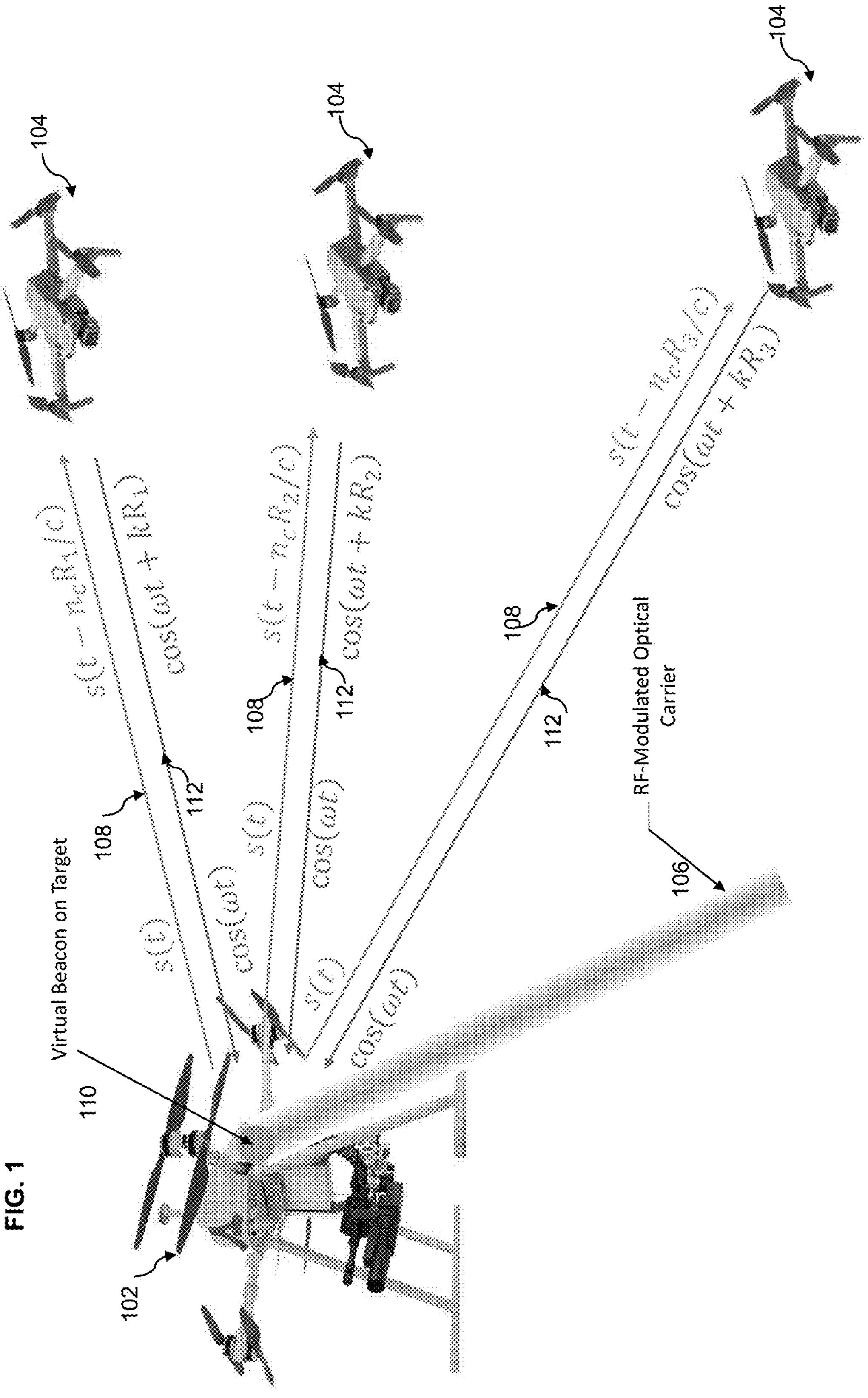
FIG. 1 illustrates an array of independent coherent mobile elements and a mobile target, according to some embodiments of the disclosure.

FIG. 1 illustrates a three-dimensional (3-D) array of independent coherent mobile antenna array elements 104 (for example drones, ground vehicles and/or sea vessels) and a mobile target 102, according to some embodiments of the disclosure. In this example, the array is a 3-D array of mutually-coherent mobile airborne elements 104. However, one or more of the mutually-coherent mobile elements 104 and the target 102 may be on the ground or in the sea. Moreover, one or more of the mutually-coherent mobile elements 104 and the target 102 may be stationary at least for some period of time. As shown, a virtual beacon 106 on the target 102 distributes an RF pilot signal 108, scattered from the target 102, to some or all array elements 104.

In some embodiments, the virtual beacon is a collimated beam that is generated remotely and transmitted from a manned or unmanned aircraft, a manned or unmanned ground vehicle, a manned or unmanned surface vessel, an array element, or dismounted ground personnel.

From the received pilot signal 108 each array element 104 generates a reference signal in the form of a local oscillator (LO) with a frequency and phase common to all elements by using target-to-element distance to compensate for accumulated target-to-element phase. Since at least some of the array elements (and possibly the target) are mobile, this distance dynamically changes. The LO and the distance to the target are used to dynamically phase conjugate the pilot signal, which is amplified and transmitted towards the target. With the phase adjustment as a function of the distance to the target of each array element, the phase conjugated RF signals transmitted by individual array elements arrive at the target with a common phase where they add coherently and generate a small spot on the target of enhanced power density.

The virtual beacon 106 broadcasts the RF pilot signal 108 which is received by some or all elements of the array. The phase of the received pilot signal 108 is conjugated with a phase reference derived from the received pilot signal itself, and takes into account the distance to the target. The process of conjugating the phase of the received pilot signal and correcting for the distance to the target for each array element causes the phase accumulated during propagation from the beacon to each node to be cancelled during the return trip. As a result, the radiated signals 112 transmitted by the individual array elements 104 arrive at the target with a common phase where they add coherently and increase the power density on the target 102. The radiated signals 112 may be continuous signals or series of pulses.

Figure 3:
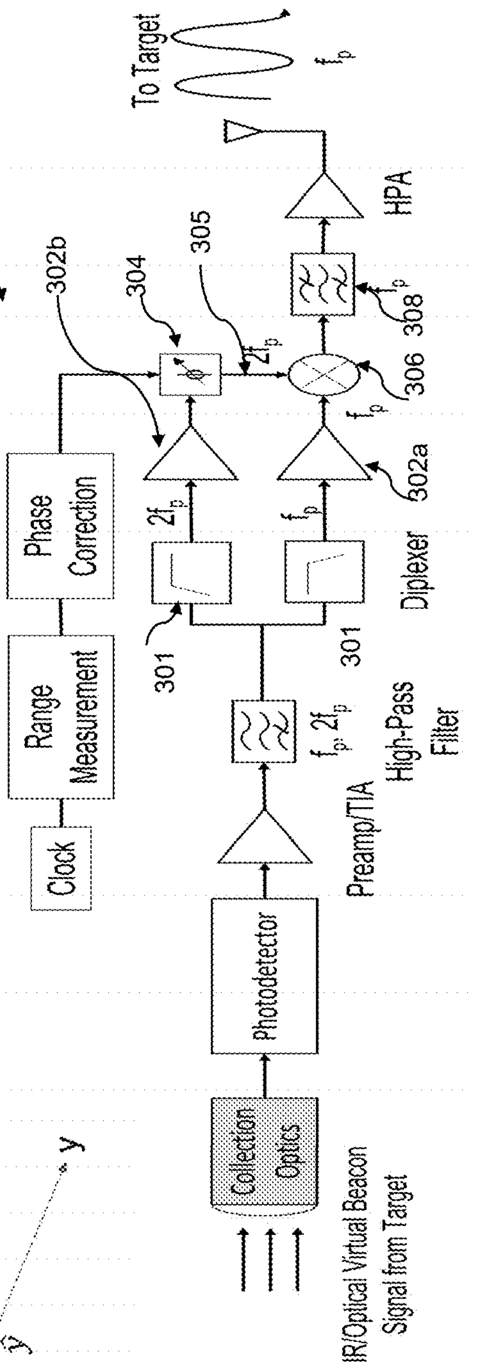
FIG. 3 shows a hardware block diagram for a virtual beacon transceiver, according to some embodiments of the disclosure.

In some embodiments, the phase reference may be derived from the pilot signal itself. For example, FIG. 3 shows the phase being derived from a separate RF component at twice the frequency of the RF pilot, which is already present in the directly detected beacon signal; that is, the component at the 2nd harmonic is generated by the direct detection process.

The present approach utilizes the frequency of the RF signal and the distance to the target to correct the phase of each radiated signal 112 transmitted by a corresponding array element 104. More specifically, distance to target and frequency of the RF signal are used to calculate a local oscillator phase correction. The phase-corrected local oscillator signal is then used to phase conjugate the received RF pilot signal before transmitting it back towards the target.

In some embodiments, the virtual beacon 110 is formed by scattering the RF modulated laser beam from the target, where each array element 104 extracts the RF pilot signal from the received laser signal by direct detection, using known ultrahigh-frequency signal detection circuits. In some embodiments, a physical beacon may be placed on the target to radiate a sub-harmonic RF pilot signal (to avoid simultaneous transmit and receive (STAR) interference). The beacon is placed on the target covertly if the target is uncooperative. In some embodiments, coherence is achieved by using measured element-to-target distance to correct each LO for accumulated target-to-element propagation phase, yielding LOs that are synchronized in frequency and phase throughout the array.

As shown in FIG. 1, the target 102 may be illuminated by an amplitude-modulated IR, visible or UV laser beam, s(t) (for example, virtual beacon 106), at time t, where:

$$s(t) = [a + b\cos(\omega_p t + \theta_0)]\cos\omega_c t$$

And where $\omega_p = 2\pi f_p$ is the frequency of the pilot RF signal, $\omega_c = 2\pi f_c$ is the carrier (laser beam) frequency, a and b are dimensionless constants representing the DC and RF amplitudes of the optical beam modulation, and $\theta_0$ is an arbitrary phase.

Direct detection yields a signal proportional to the incident intensity $|s_k(t - n_c r_k/c)|^2$ averaged over a single period of the carrier $f_c$. Each array element 102 extracts from this signal an RF pilot signal at frequency $f_p$ and a frequency-doubled component at frequency $2f_p$. In some embodiments, the LO may be derived from a 2nd harmonic component present in the directly-detected beacon signal. In other embodiments, the LO is derived separately on board each element, by frequency doubling a small component of the RF pilot signal.

The RF pilot signal frequency $f_p$ is measured and is used with measured target-to-element distance $r_k(t)$ to generate a phase-corrected LO signal:

$$v_p(t) = V_p\cos\left[\omega_p\left(t - \frac{n_c r_k}{c}\right) + \theta_0\right]$$

$$v_{LO}(t) = V_{LO}\cos\left[2\omega_p\left(t - \frac{n_c r_k}{c}\right) + 2\theta_0 + \theta_k^{LO}(t)\right]$$

where:

$V_p$ = Amplitude of the extracted $RF$ pilot, $V_{LO}$ = Amplitude of the phase−corrected $LO$ signal, $n_c$ = Atmospheric index of refraction at the carrier frequency $\omega_c$, $r_k$ = Distance from the target to the $k^{th}$ array element (time dependent), and $\theta_k^{LO}(t)$ = Time−dependent $LO$ phase correction for the $k^{th}$ array element The pilot and LO signals are then mixed to produce a phase-conjugated signal at the difference frequency, so that they all arrive at the target with the same phase:

$$s_k(t) = S_k\cos\left[\omega_p\left(t + \frac{n_c r_k}{c}\right) + \theta_0 + \Phi_k - \frac{4\pi n_c r_k}{\lambda_p} + \theta_k^{LO}(t)\right]$$

where $\Phi_k$ is the fixed element imposed phase (due to propagation through cables, component insertion phases, etc.), and $$\frac{4\pi n_c r_k}{\lambda_p}$$

is the accumulated Lu phase to be corrected. The phase $\Phi_k$ can be measured for each element (by the manufacturer for example) and stored onboard for use in calculating the LO phase correction. Furthermore $\lambda_p$ is the free-space wavelength of the RF pilot signal ($=c/f_p=2\pi c/\omega_p$), and $S_k$ is the amplitude of the RF signal prior to transmission towards the target.

The phase of the LO is then compensated using measured target-to-element range $\bar{r}_k(t)$ to correct for the accumulated propagation phase:

$$\theta_k^{LO}(t) = \frac{4\pi\bar{n}\bar{r}_k(t)}{\lambda_p} - \Phi_k + \Delta\theta_k \text{ with } \bar{n} = \frac{n_p + n_c}{2}$$

where $\Delta\theta_k$ is a phase error which accounts for errors in element-to-target distance measurement, random variation in element path lengths, $n_p$ is the atmospheric index of refraction at the RF pilot signal frequency $\omega_p$ and $\bar{n}$ is the average index of refraction (nearly equal to 1).

Following phase conjugation, amplification and re-transmission, the signal arriving at the target is:

$$S = \sum_{k=1}^{N} s_k(t) = \sum_{k=1}^{N} S_k\cos\left\{\omega_p t - \theta_0 + \Delta\theta_k + \frac{4\pi\bar{n}}{\lambda_p}[\bar{r}_k(t) - r_k(t)]\right\}$$

Ideally $\bar{r}_k(t)=r_k(t)$ and $\Delta\theta_k=0$ for all values of k, in which case there are no element-dependent terms (no k dependence) in the arguments of the cosine terms, i.e, all terms have identical frequencies and phases, and therefore add coherently at all times.

Phase corrections may be discrete or quasi-continuous. In the discrete case, phase corrections may be made at discrete intervals with phases remaining constant between corrections. In one embodiment quasi-continuous (discrete but with a much shorter update interval than the distance measurement interval) phase corrections are derived from measured target-to-element distance and one or more derivatives of said distance with respect to time. Derivatives allow estimates to be made of the target-to-element distance during intra-measurement intervals, during which phase corrections are applied based on the distance estimates. Derivatives may be measured directly or estimated from current and past distance measurements.

If periodic measurements of the target-to-element distance $$r_k(t_m) \equiv r_k^{(0)}(t_m)$$

are made at times $t_m$ and the first N time derivatives $$r_k^{(1)}(t_m),\ r_k^{(2)}(t_m),\ \ldots\ ,\ r_k^{(N)}(t_m)$$

are determined then $r_k(t)$ is approximated by the first N terms of a Taylor series for times $t_m \le t \le t_{m+1}$ as follows:

$$\bar{r}_k(t) = \sum_{n=0}^{N} \frac{1}{n!} r_k^{(n)}(t_m)(t - t_m)^n$$

In some embodiments, only position $$\bar{r}_k(t)=r_k^{(0)}(t_m)$$

is measured; then, if element velocities change little between measurements, the element phase error due to position measurement error is approximated by $$\bar{r}_k(t_m)=r_k^{(0)}(t_m)\rightarrow\frac{4\pi\bar{n}}{\lambda_p}[\bar{r}_k(t)-r_k(t)]=-\frac{4\pi\bar{n}}{\lambda_p}v_k(t-t_m)$$

Limiting the phase error magnitude constrains the product of the element velocity magnitude $|v_k|$ and the measurement interval $\Delta t_m$. If a maximum phase error of 45 degrees is desired ($\pi/4$ radians), then $$\frac{4\pi|v_k|\Delta t_m}{\lambda_p}\leq\frac{\pi}{4}\rightarrow|v_k|\Delta t_m\leq\frac{\lambda_p}{16}$$

For example, if $v_k$=1 m/s and $f_p$=1 GHz ($\lambda_p$=30 cm), then $\Delta t_m\leq 18.75$ milliseconds.

In some embodiments, position and velocity $$r_k^{(0)}(t_m)\text{ and }r_k^{(1)}(t_m)=v_k(t_m)$$

are both determined:

$$r_k(t)=r_k(t_m)+v_k(t_m)(t-t_m)$$

If element velocity is constant between measurement intervals, the phase error is zero:

$$\bar{r}_k(t)=r_k(t_m)+v_k(t_m)(t-t_m)\rightarrow\frac{4\pi\bar{n}}{\lambda_p}[\bar{r}_k(t)-r_k(t)]=0$$

That is, over intervals during which the element velocity is or can be approximated as constant, positional and velocity updates compensate for element motion. Velocity can be estimated from previous measurements of position or directly measured.

In some embodiments, the range to target measurement is performed directly, for example using laser-based direct measurement using known range measuring devices on the elements. In these cases, array elements cannot mistake a return signal from another element range-finding pulse as return from its own pulse. In some embodiments, a different laser frequency is used for each element. In some embodiments, direct-sequence spread spectrum (DSSS)-modulated ranging pulses with orthogonal pseudorandom binary (PN) codes assigned to each element may be used. In some embodiments, array element clocks are synchronized, where each element ranges on a predetermined schedule so only one element ranges at a time.

In some embodiments, the direct range to target measurement is performed using known time-of-flight one-to-all range distribution, where the virtual beacon illuminator accurately measures distance to the illuminated spot on target, for example, using high-resolution laser rangefinder. In these cases, all array elements may be equipped with synchronized high-accuracy clocks, for example chip-scale atomic clocks. The illuminator transmits periodic timing pulses, where transmission of the pulses is delayed so pulses arrive on target at pre-determined times. Array elements extract target-to-element distance from time of flight from target to element.

The range-dependent portion of LO correction phase is (in degrees):

$$(180/\pi)\mathrm{mod}\big(4\pi\bar{n}(f_p/c)R,\ 2\pi\big).$$

In some embodiments, each element can closely estimate the frequency $f_p$ of the RF pilot signal using digital signal processing. A portion of the received pilot signal is sampled by an analog-to-digital converter (ADC). Accumulated samples are processed using a Fast Fourier Transform (FFT) to determine the frequency components present within the signal. As frequency resolution is inversely proportional to the number of samples, frequency resolution increases with time as samples accumulate.

In some embodiments, the present approach uses the gravitational force and local Earth magnetic field to establish a common reference coordinate system for use in element-to-element polarization alignment.

Figure 2:
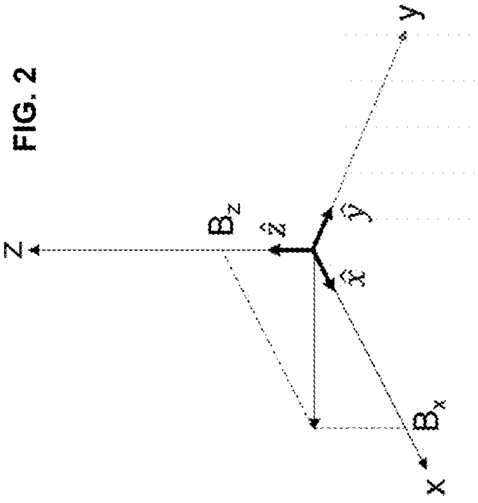
FIG. 2 depicts a three-dimensional reference coordinate system derived from the local value of gravitational acceleration vector and Earth's magnetic field vector, according to some embodiments of the disclosure.

FIG. 2 depicts a three-dimensional reference coordinate system derived from the local gravitational acceleration vector and Earth's magnetic field vector, according to some embodiments of the disclosure. A set of coordinate systems (one for each element) with parallel axes are needed to align radiated field polarizations. Earth's gravitational and magnetic fields are used to define the axes of a local Cartesian coordinate system common to all array elements. A 3-axis accelerometer measures the local gravitational acceleration vector $\vec{g}\equiv -g\hat{z}$, and a 3-axis magnetometer measures the local magnetic field vector $\vec{B}$.

For the local magnetic coordinates, the y axis is defined by $$\hat{y}=\frac{\hat{z}\times\vec{B}}{|\hat{z}\times\vec{B}|}$$

and the x axis is defined by $\hat{x}=\hat{y}\times\hat{z}$. With this definition, $\hat{x}$ is parallel to the projection of $\vec{B}$ onto a plane perpendicular to $\hat{z}$; that is, roughly speaking, $\hat{x}$ points north. Some commercially available sensors (e.g., VN-100 IMU/AHRS) combine 3-axis accelerometers, gyros, and magnetometers, barometric pressure sensor, and a 32-bit processor may serve as low-power lightweight polarization alignment sensors.

As noted above, the radiated signals transmitted by each array element (e.g., signal 112 in FIG. 1) may be continuous signals or a series of pulses. In the case of pulses, time synchronization is needed to ensure pulse envelope overlap and/or modulation alignment. Synchronization requirement is proportional to inverse of bandwidth. For example, for a 1 GHz carrier and 20% bandwidth, $\Delta t$=5 ns. In some embodiments, chip-scale atomic clocks (CSACs) offer low drift in a compact, low-power package, where short term stability=$3\times10^{-10}\Rightarrow\Delta t$=5 ns at 17 seconds.

In some embodiments, timing signals are distributed via the virtual beacon and the periodic synchronization signal disciplines an on-board low-drift clock (e.g., CSAC). For example, virtual beacon timing pulses are combined with target-to-element ranging to discipline an onboard clock for the purpose of pulse envelope overlap and/or modulation alignment. For instance, in a case where phase modulation is used to encode time on the RF pilot signal, relevant circuitry senses phase modulation and engages a phase lock loop (PLL) to maintain the pilot signal and the LO during receipt of the clock pulses. In some embodiments, a separate optical carrier is utilized to avoid interrupting pilot signal delivery.

FIG. 3 shows an exemplary hardware block diagram for a virtual beacon transceiver 300, according to some embodiments of the disclosure. Although, FIG. 3 shows an example of a hardware implementation of a virtual beacon, one skilled in the art would recognize that there are other ways of implementing the functionality of the virtual beacon transceiver. As shown, the optical virtual beacon with a modulated RF signal having a frequency $f_p$ is received from the target by optical collection circuitry, converted to an electrical signal by, for example, a photodetector and amplified by a preamplifier. The electrical signal then goes through a high-pass filter and is then input to a diplexer 301 to separate two RF signals with frequencies of $f_p$ and $2f_p$, respectively, where the upper branch of diplexer 301 passes high frequencies and the lower branch of diplexer 301 passes low frequencies. The two RF signals are optionally amplified by respective amplifiers 302.

A range measurement circuit driven by a clock measures the range and the phase correction circuit provides the required phase correction. In some embodiments, the clock is an on-board clock. In some embodiments, array element range measurements occur on a predetermined schedule to prevent interference. In these embodiments, the accuracy of the range measurement scheduling clock is such that any clock drift is very small compared to the range measurement interval (the time interval between consecutive range measurements for any array element).

The phase of the RF signal with frequency of $2f_p$ is then corrected by a phase shifter to generate a phase-corrected local oscillator RF signal 305. The local oscillator RF signal 305 is synchronized with the local oscillator RF signals of all other array elements. The local oscillator RF signal 305 is then mixed with the RF pilot signal with frequency of $f_p$ by a mixer 306 and goes through a band-pass filter 308 and a high power amplifier (HPA). The output of the HPA is then transmitted to the target where it adds coherently with the corresponding HPA outputs from all other elements in order to enhance power density on the target.

Figure 4:
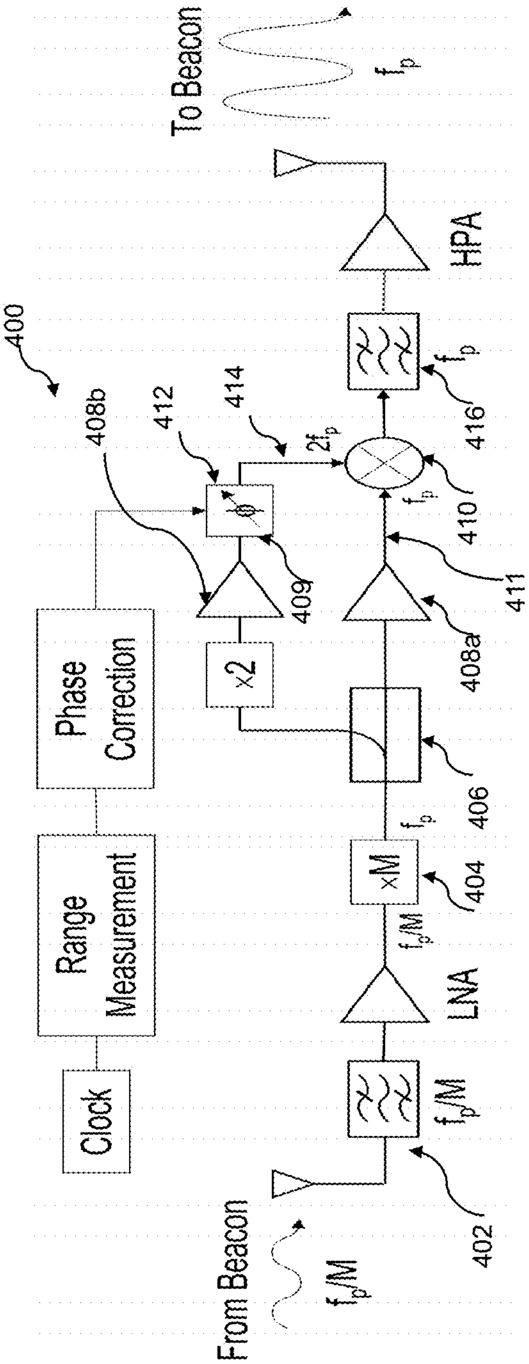
FIG. 4 depicts a hardware block diagram for a physical beacon transceiver, according to some embodiments of the disclosure.

FIG. 4 depicts a hardware block diagram for a physical beacon transceiver 400, according to some embodiments of the disclosure. As depicted, a subharmonic RF beacon signal having a frequency $f_p/M$ is received, where M is an integer. The received subharmonic beacon may go through a band-pass filter prior to amplification by a low noise amplifier (LNA). The subharmonic RF beacon signal is then processed by a ×M frequency multiplier 404 whose primary output is the RF pilot signal at the $M^{th}$ harmonic $f_p$ of the subharmonic RF beacon frequency $f_p/M$. A portion of the RF pilot signal is directed along a separate parallel path by a directional coupler 406 that couples a fraction of the incoming signal into a second signal path where its frequency is doubled. The frequency of the parallel RF signal is multiplied by 2 to generate an RF signal with frequency of $2f_p$, which is then amplified by an amplifier **408*b* to produce signal 409 with frequency of $2f_p$. Similarly, the RF signal with frequency of $f_p$, is also amplified by an amplifier 408*b* to produce signal 411** with frequency $2f_p$.

Similar to the virtual beacon transceiver 300 of FIG. 3, the phase of the RF signal with frequency of $2f_p$ is then corrected by a phase shifter 412 to generate a phase-corrected local oscillator RF signal 414. The local oscillator RF signal 414 is synchronized with the local oscillator RF signals of all other array elements. The local oscillator RF signal 414 is then mixed with the RF signal with frequency of $f_p$ by a mixer 410 and goes through a bandpass filter 416 and a high power amplifier (HPA). The output of the HPA is then transmitted to the target to where it adds coherently with the corresponding HPA outputs from all other elements in order to enhance power density on the target.

Figure 5:
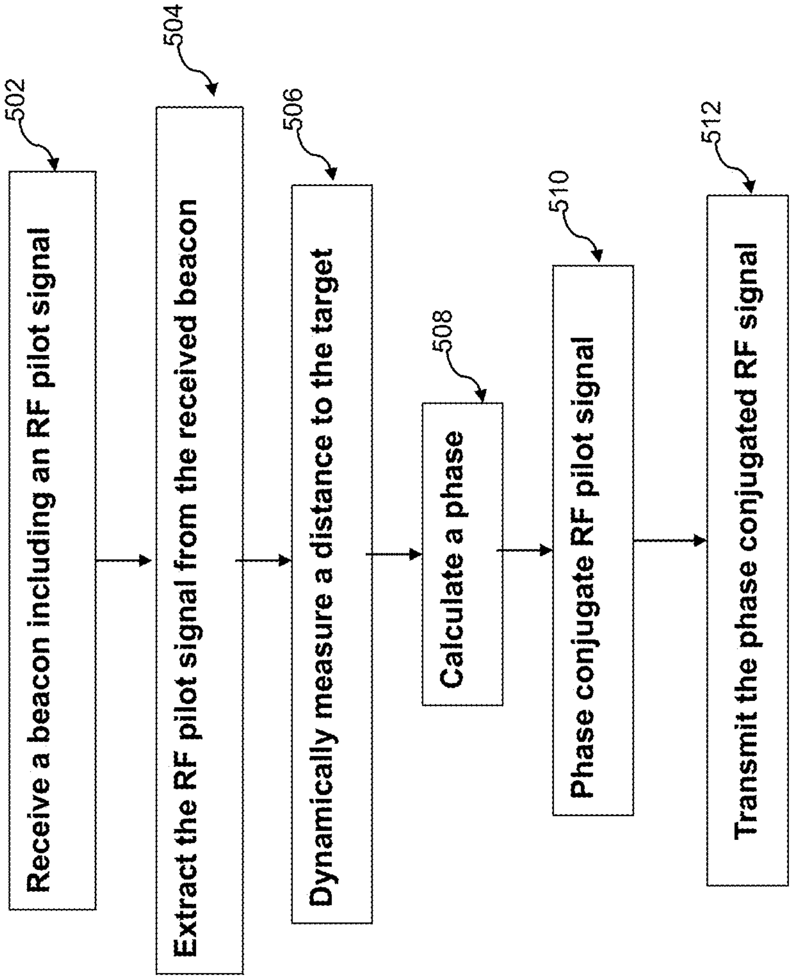
FIG. 5 illustrates a process flow diagram for generating independent coherent signal to increase power density on a target, according to some embodiments of the disclosure.

FIG. 5 illustrates a process flow diagram for generating independent coherent signals to increase power density on a target, according to some embodiments of the disclosure. The process directs RF energy from an active retrodirective antenna array comprising a plurality of moving elements onto a target. As shown in block 502, a beacon including a RF pilot signal imposed thereon is received by each element. In some embodiments, the beacon is a virtual beacon scattered from the target. In some embodiments, the beacon is a physical RF beacon received from a device placed on the target. In some embodiments, the virtual beacon illuminates an area on the target, the area of illumination being small compared to the free-space wavelength of the RF pilot signal. In some embodiments, the RF radiating region of the physical beacon is small compared to the free-space wavelength of the RF pilot signal.

In some embodiments, the virtual beacon is an infrared signal, however, other high-frequency signals may be used as the virtual beacon. The beacon frequency needs to be higher than the RF pilot signal frequency, therefore the virtual beacon frequency may lie in the millimeter wave, terahertz, infrared, visible, or even ultraviolet portions of the electromagnetic spectrum.

As depicted in block 504, the RF pilot signal is extracted from the received beacon, by each element using known high-frequency signal detection circuits. In the case of the physical beacon, the beacon signal is a subharmonic fp/M of the pilot signal frequency fp. This is done to provide separation between the RF beacon signal frequency fp/M and the pilot signal frequency fp so that each element can receive the beacon signal at fp/M while transmitting a phase-conjugated pilot signal at frequency fp. Here the beacon signal is not impressed on a carrier as it is with the (virtual) optical beacon. Note that with the optical beacon the frequency separation is provided by the optical carrier; there is no threat of interference between transmit and receive since the received signal is optical and the transmitted signal is RF.

In block 506, each element dynamically measures a distance to an area of virtual illumination on the target or to the physical beacon itself. The distance measurement is performed by a range measurement circuit, which is driven by a clock. In some embodiments, the clock is an on-board clock. In some embodiments the on-board clock may be a dedicated distance measurement clock. In some embodiments, array element distance measurements occur on a predetermined time schedule to prevent signal interference. In these embodiments, the accuracy of the distance measurement scheduling clock is such that any clock drift is very small compared to the distance measurement interval (the time interval between consecutive range measurements for any array element).

In some embodiments, distance-measurement is performed by laser distance sensors on each element with a unique operating frequency assigned to each element for non-interference. In some embodiments, the laser distance sensors implement non-interfering range measurements by transmitting direct-sequence spread-spectrum encoded pulses, with separate orthogonal pseudo-random binary codes assigned to each element.

In block 508, each element calculates a phase utilizing the measured distance to the area of beacon illumination on the target and a frequency of the extracted RF pilot signal. Each element then phase conjugates the RF pilot signal based on the calculated phase in block 510, and transmits the phase conjugated RF signal towards the target in block 512. Accordingly, the phase conjugated RF signals transmitted by the plurality of elements add coherently (i.e., in phase) at the area of beacon illumination on the target with nearly equal phases to enhance power density on the target.

It will be recognized by those skilled in the art that various modifications may be made to the illustrated and other embodiments of the disclosure described above, without departing from the broad inventive scope thereof. It will be understood therefore that the disclosure is not limited to the particular embodiments or arrangements disclosed, but is rather intended to cover any changes, adaptations or modifications which are within the scope and spirit of the disclosure as defined by the appended claims and drawings.

The invention claimed is:

1. A method of directing radio frequency (RF) energy from an active retrodirective antenna array comprising a plurality of moving elements onto a target, the method comprising:
- receiving a virtual beacon scattered from the target by each element, the scattered virtual beacon including an RF pilot signal imposed thereon;
- extracting the RF pilot signal from the received scattered virtual beacon by each element;
- dynamically measuring a distance to an area of virtual beacon illumination on the target by each element;
- calculating a phase utilizing the measured distance to the area of the target and a frequency of the extracted RF pilot signal by each element;
- phase conjugating the RF pilot signal based on the calculated phase by each element;
- transmitting the phase conjugated RF signal towards the target by each element, wherein the phase conjugated RF signals transmitted by the plurality of moving elements add coherently at the area of virtual beacon illumination on the target to enhance power density on the target; and
- combining virtual beacon timing pulses with target-to-element ranging to discipline an onboard clock for pulse envelope overlap or modulation alignment.

2. The method of claim 1, further comprising generating a reference signal in a form of a local oscillator (LO) with a frequency and phase common to all the elements.

3. The method of claim 1, wherein the virtual beacon is generated remotely and transmitted from a manned or unmanned aircraft, a manned or unmanned ground vehicle, a manned or unmanned surface vessel, an array element, or dismounted ground personnel.

4. The method of claim 1, further comprising determining a velocity of each element relative to the target and utilizing a respective measured distance and determined velocity to calculate the phase, by each respective element.

5. The method of claim 1, wherein dynamically measuring the distance is performed by each element asynchronously according to a pre-determined timing schedule.

6. The method of claim 1, wherein the phase conjugated RF signal is pulsed or continuous.

7. The method of claim 1, further comprising using gravitational acceleration vector and local Earth magnetic field vector to establish a common reference coordinate system for element-to-element polarization alignment.

8. The method of claim 1, wherein the virtual beacon is a high frequency virtual beacon.

9. The method of claim 8, wherein the virtual beacon is an infrared signal.

10. The method of claim 8, wherein the virtual beacon is one of millimeter wave, terahertz, visible, or ultraviolet.

11. The method of claim 8, wherein the RF pilot signal is amplitude modulated in the virtual beacon.

12. The method of claim 1, wherein dynamically measuring the distance to the area of virtual beacon illumination on the target is performed by a range measurement circuit driven by a range measurement scheduling clock.

13. The method of claim 1, wherein dynamically measuring the distance to the area of virtual beacon illumination on the target is performed by a plurality of laser distance sensors on each element with a unique operating frequency assigned to each element for non-interference.

14. The method of claim 1, wherein dynamically measuring the distance to the area of virtual beacon illumination on the target is performed by a plurality of laser distance sensors on each element, and wherein the laser distance sensors implement non-interfering distance measurements by transmitting direct-sequence spread-spectrum encoded pulses, with separate orthogonal pseudo-random binary codes assigned to each element.

15. A system for directing radio frequency (RF) energy from an active retrodirective antenna array comprising a plurality of moving elements onto a target comprising:
- means for receiving a virtual beacon scattered from the target by each element, the scattered virtual beacon including an RF pilot signal imposed thereon;
- means for extracting the RF pilot signal from the received scattered virtual beacon by each element;
- means for dynamically measuring a distance to an area of virtual beacon illumination on the target by each element;
- means for calculating a phase utilizing the measured distance to the area of the target and a frequency of the extracted RF pilot signal by each element;
- means for phase conjugating the RF pilot signal based on the calculated phase by each element;
- means for transmitting the phase conjugated RF signal towards the target by each element, wherein the phase conjugated RF signals transmitted by the plurality of moving elements add coherently at the area of virtual beacon illumination on the target to enhance power density on the target; and
- means for using a gravitational acceleration vector and a local Earth magnetic field vector to establish a common reference coordinate system for element-to-element polarization alignment.

16. A method of directing radio frequency (RF) energy from an active retrodirective antenna array comprising a plurality of moving elements onto a target, the method comprising:
- receiving a beacon scattered from the target by each element, the scattered beacon including an RF pilot signal imposed thereon;
- extracting the RF pilot signal from the received scattered beacon by each element;
- dynamically measuring a distance to an area of beacon illumination on the target by each element asynchronously according to a pre-determined timing schedule;

calculating a phase utilizing the measured distance to the area of the target and a frequency of the extracted RF pilot signal by each element;

phase conjugating the RF pilot signal based on the calculated phase by each element; and transmitting the phase conjugated RF signal towards the target by each element, wherein the phase conjugated RF signals transmitted by the plurality of moving elements add coherently at the area of beacon illumination on the target to enhance power density on the target.

17. The method of claim 16, wherein the beacon is one of a virtual beacon or an RF beacon.

18. The method of claim 17, wherein:

the beacon is the RF beacon;

each element extracts the beacon as a subharmonic of the pilot signal; and each element generates an RF pilot signal from the beacon by frequency multiplication.

19. A method of directing radio frequency (RF) energy from an active retrodirective antenna array comprising a plurality of moving elements onto a target, the method comprising:

receiving a virtual beacon scattered from the target by each element, the scattered virtual beacon including an RF pilot signal imposed thereon;

extracting the RF pilot signal from the received scattered virtual beacon by each element;

dynamically measuring a distance to an area of virtual beacon illumination on the target by each element using a plurality of distance sensors on each element with a unique operating frequency assigned to each element for non-interference;

calculating a phase utilizing the measured distance to the area of the target and a frequency of the extracted RF pilot signal by each element;

phase conjugating the RF pilot signal based on the calculated phase by each element; and transmitting the phase conjugated RF signal towards the target by each element, wherein the phase conjugated RF signals transmitted by the plurality of moving elements add coherently at the area of virtual beacon illumination on the target to enhance power density on the target.

20. A method of directing radio frequency (RF) energy from an active retrodirective antenna array comprising a plurality of moving elements onto a target, the method comprising:

receiving a virtual beacon scattered from the target by each element, the scattered virtual beacon including an RF pilot signal imposed thereon;

extracting the RF pilot signal from the received scattered virtual beacon by each element;

dynamically measuring a distance to an area of virtual beacon illumination on the target by each element using a plurality of laser distance sensors on each element, wherein the laser distance sensors implement non-interfering distance measurements by transmitting direct-sequence spread-spectrum encoded pulses, with separate orthogonal pseudo-random binary codes assigned to each element;

calculating a phase utilizing the measured distance to the area of the target and a frequency of the extracted RF pilot signal by each element;

phase conjugating the RF pilot signal based on the calculated phase by each element; and transmitting the phase conjugated RF signal towards the target by each element, wherein the phase conjugated RF signals transmitted by the plurality of moving elements add coherently at the area of virtual beacon illumination on the target to enhance power density on the target.

* * * * *